May 12, 1942.   L. B. MOTTE   2,282,671
MEAT GRINDER
Filed Dec. 9, 1940   2 Sheets-Sheet 1

Inventor
Lewis B. Motte

By Clarence A. O'Brien

Attorney

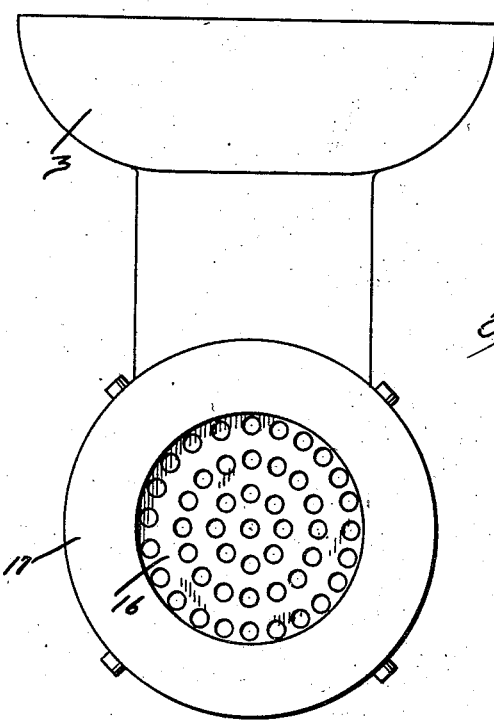
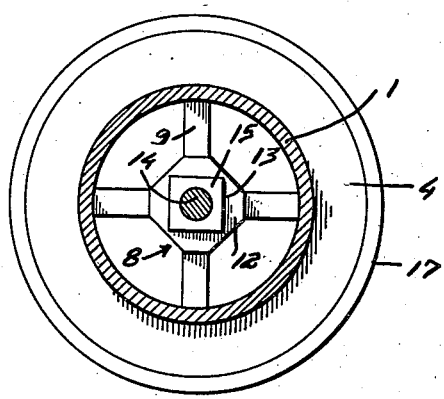
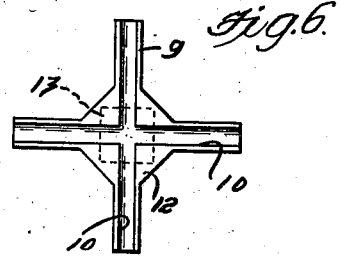

Patented May 12, 1942

2,282,671

UNITED STATES PATENT OFFICE 2,282,671

MEAT GRINDER

Lewis B. Motte, Savannah, Ga.

Application December 9, 1940, Serial No. 369,312

4 Claims. (Cl. 146—189)

The present invention relates to new and useful improvements in meat grinders for use particularly in sausage mills and has for its primary object to provide, in a manner as hereinafter set forth, a device of this character embodying novel means for rotatably supporting the forward end of the worm whereby the usual centrally located bearing and stud are eliminated.

Another very important object of the invention is to provide a meat grinder of the aforementioned character embodying a novel construction and arrangement of perforated plate or disk and knife units whereby maximum efficiency is attained.

Still another important object of the invention is to provide a meat grinder of the character described which may be expeditiously assembled or disassembled.

Other objects of the invention are to provide a meat grinder which will be comparatively simple in construction, strong, durable, reliable and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in front elevation thereof.

Figure 4 is a cross sectional view, taken substantially on the line 4—4 of Figure 1.

Figure 6 is a view in front elevation of the blade carrier of the knife unit.

Figure 1:
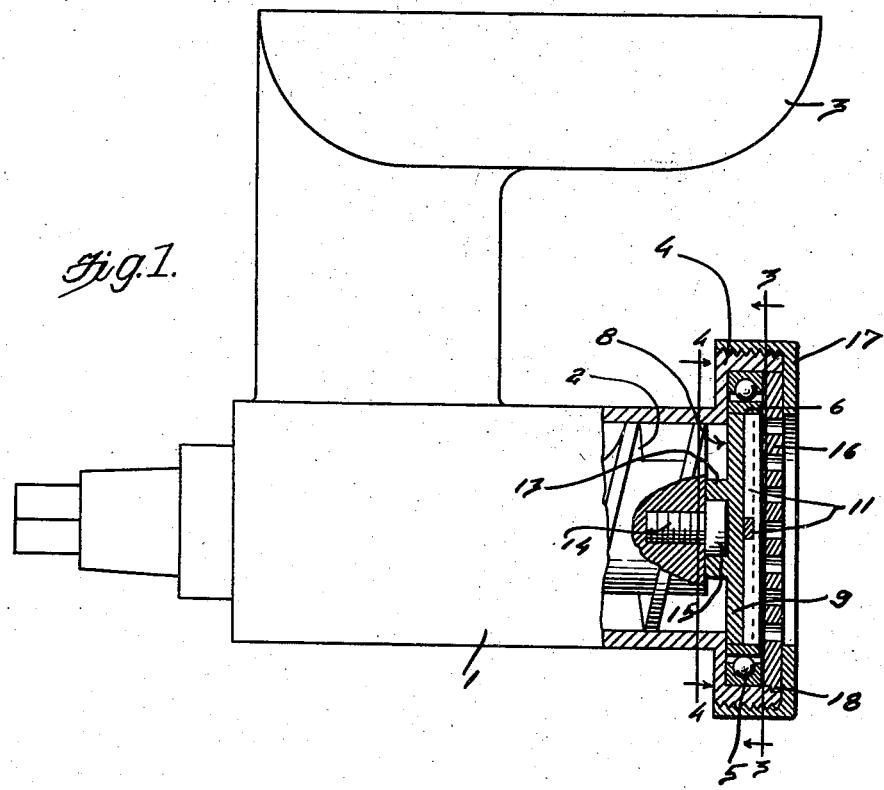
Figure 1 is a view partially in side elevation and partially in vertical longitudinal section, showing a meat grinder constructed in accordance with the present invention.
Figure 3:
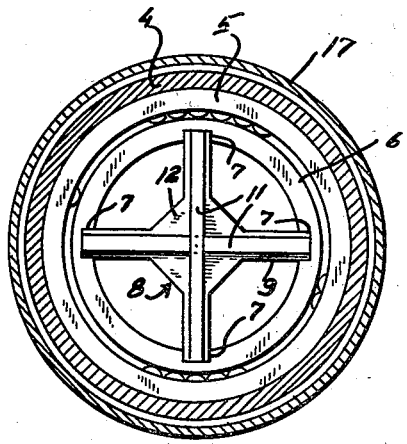
Figure 3 is a cross sectional view, taken substantially on the line 3—3 of Figure 1.
Figure 5:
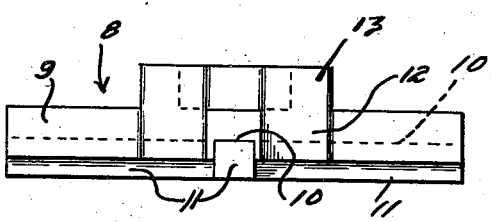
Figure 5 is a plan view of the knife unit.

Referring now to the drawings in detail, it will be seen that the reference numeral 1 designates a horizontal cylinder in which a worm 2 is operable. Communicating with the rear portion of the cylinder 1 is a meat hopper 3. At its forward end, the cylinder 1 terminates in an enlarged, externally threaded head 4.

Mounted in the head 4 is a suitable bearing 5. In the embodiment shown, a ball bearing has been illustrated. However, a plain or other bearing may be used. Also, the bearing 5 is removable.

Rotatably mounted in the bearing 5 is a removable ring 6 of suitable metal. The inner circumference of the ring 6 has formed therein spaced notches or recesses 7. Removably mounted in the ring 6 is a knife unit which is designated generally by the reference numeral 8.

The knife unit 8 comprises a carrier or holder 9 in the form of a cross of suitable metal. The outer or free end portions of the arms of the substantially cross shaped holder 9 are engaged in the notches or recesses 7 for removably mounting the unit 8 in the ring 6. The front of the holder 9 has formed therein intersecting grooves or channels 10 for the reception of removable shearing blades 11.

The holder 9 further includes a hub portion 12 which is formed to provide a rearwardly projecting substantially square socket 13. Threadedly mounted in the forward end portion of the worm 2 is a stud bolt 14 having a square head 15 which is engaged in the socket 13. Thus, the holder 9 is detachably connected to the worm 2 for rotation therewith.

Removably mounted in the head 4 forwardly of the knife unit 8 is a perforated plate or disk 16 which may also be of any siutable metal. The perforated disk 16 is secured in position in contact with the blades 11 through the medium of an internally flanged and threaded retaining ring 17 which is screwed on the head 4. A lug 18 on the periphery of the disk 16 is engaged in a groove provided therefor in the head 4 for securing said disk against rotation.

It is thought that the operation of the invention will be readily apparent from a consideration of the foregoing. Briefly, meat from the hopper 3 feeds by gravity to the cylinder 1 and is carried forwardly by the worm 2. This meat is forced through the perforated disk or plate 16 by the worm 2. As the meat enters the perforations of the disk 16 it is sheared or cut by the rotating blades 11 of the knife unit 8. It will be observed that the construction and arrangement is such that the forward end of the worm 2 and the unit 8 are adequately supported without the use of a centrally located bearing. The advantages flowing from the elimination of this centrally located bearing are well known to those skilled in the art to which the invention pertains.

It is believed that the many advantages of a meat grinder constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A meat grinder comprising a cylinder, a worm operable in said cylinder, a ring rotatably mounted in the cylinder forwardly of the worm, a holder mounted in said ring, means for supporting the forward end of the worm on the holder and for driving said holder from said worm, a perforated disk mounted in the cylinder forwardly of the holder, and shearing blades mounted in the holder and cooperable with the perforated disk.

2. A meat grinder comprising a cylinder, a feed worm operable in said cylinder, a bearing mounted in the cylinder forwardly of the worm, a ring journaled in said bearing, said ring having spaced notches in its inner circumference, a substantially cross shaped holder removably mounted in the ring and having the outer end portions of its arms engaged in the notches, said holder having intersecting grooves therein, said holder further comprising a hub portion including a rearwardly projecting polygonal socket member, a stud bolt threadedly mounted in the forward end portion of the worm and including a polygonal head engaged in the socket member, said bolt constituting means for supporting the forward end of the worm on the holder and for driving said holder from said worm, a perforated disk mounted in the cylinder forwardly of the holder, and shearing blades mounted in the grooves of the holder and cooperable with said perforated disk.

3. A meat grinder comprising a cylinder, a feed worm operable in said cylinder, a ring journaled in the cylinder forwardly of the worm, a perforated disk mounted in the cylinder forwardly of said ring, a holder removably mounted in the ring, means connecting the forward end of the worm to the holder for driving said holder and for supporting said worm, and blades mounted on the holder and cooperable with the perforated disk.

4. In a meat grinder of the character described, a cutting assembly embodying a ring having spaced notches in its inner circumference, a substantially cross-shaped holder removably mounted in the ring and having the outer end portions of its arms engaged in the notches, said holder also having intersecting grooves therein extending continuously across the outer face of the holder from end to end of the arms of the cross, and shearing blades mounted in the grooves of the holder and extending throughout the length of the grooves.

LEWIS B. MOTTE.